US012574593B2

(12) United States Patent
Murugan

(10) Patent No.: US 12,574,593 B2
(45) Date of Patent: Mar. 10, 2026

(54) REMOTE ENGAGEMENT SYSTEM

(71) Applicant: Chandrasagaran Murugan, Johannesburg (ZA)

(72) Inventor: Chandrasagaran Murugan, Johannesburg (ZA)

( * ) Notice: Subject to any disclaimer, the term of this patent is extended or adjusted under 35 U.S.C. 154(b) by 135 days.

(21) Appl. No.: 17/999,450

(22) PCT Filed: May 20, 2021

(86) PCT No.: PCT/ZA2021/050035
§ 371 (c)(1),
(2) Date: Nov. 21, 2022

(87) PCT Pub. No.: WO2021/237254
PCT Pub. Date: Nov. 25, 2021

(65) Prior Publication Data
US 2023/0224539 A1      Jul. 13, 2023

Related U.S. Application Data

(60) Provisional application No. 63/071,907, filed on Aug. 28, 2020, provisional application No. 63/027,481, filed on May 20, 2020.

(51) Int. Cl.
*H04N 21/442*      (2011.01)
*A41D 1/00*      (2018.01)
(Continued)

(52) U.S. Cl.
CPC ....... *H04N 21/44218* (2013.01); *A41D 1/002* (2013.01); *G06V 20/42* (2022.01);
(Continued)

(58) Field of Classification Search
CPC ......... H04N 21/44218; H04N 21/2187; H04N 21/41407; H04N 21/41415;
(Continued)

(56) References Cited

U.S. PATENT DOCUMENTS 8,284,061 B1    10/2012  Dione
2007/0156883 A1 *  7/2007  Thompson ....... H04N 21/41415
709/223

(Continued)

FOREIGN PATENT DOCUMENTS

WO      WO-2019229909 A1 *  12/2019  ............. H04N 23/60

OTHER PUBLICATIONS

Chiang et al., "Vision-based Raising Hand Detection in Classroom", IAPR International Conference on Machine Vision Applications, May 23, 2013, retrieved on [Sep. 17, 2021].

*Primary Examiner* — Cynthia M Fogg
(74) *Attorney, Agent, or Firm* — WCF IP

(57)      ABSTRACT

A remote engagement system for a live event occurring at a venue includes an output device located at the venue or remotely from the venue for providing audio and/or visual output to at least one recipient. A controller receives signals, such signals being representative of physical reactions of remote viewers and being transmitted from a plurality of user input devices located remotely from each other and from the venue and controls the output device located at the venue or remotely from the venue to provide an audio and/or visual output to people at the venue or located remotely from the venue.

25 Claims, 11 Drawing Sheets

Applaud

Come On!

Flag Wave!

Yeah!

Shout!

Nooo!

(51) Int. Cl.

| | |
|---|---|
| *G06V 20/40* | (2022.01) |
| *G06V 40/20* | (2022.01) |
| *H04N 21/2187* | (2011.01) |
| *H04N 21/414* | (2011.01) |
| *H04N 21/422* | (2011.01) |

(52) U.S. Cl.
CPC ......... *G06V 40/23* (2022.01); *H04N 21/2187* (2013.01); *H04N 21/41407* (2013.01); *H04N 21/41415* (2013.01); *H04N 21/42201* (2013.01); *H04N 21/42203* (2013.01)

(58) Field of Classification Search
CPC ....... H04N 21/42201; H04N 21/42203; H04N 7/147; H04N 21/252; H04N 21/25891; H04N 21/4532; H04N 21/4755; H04N 21/4668; H04N 21/4667; H04N 13/368; H04N 21/4415; H04N 21/4758; G06V 20/42; G06V 40/23; H04H 20/38; H04H 60/33
USPC .......................................................... 725/12
See application file for complete search history.

(56) References Cited

U.S. PATENT DOCUMENTS

| | | | | |
|---|---|---|---|---|
| 2007/0214471 A1* | 9/2007 | Rosenberg | ............. | H04H 20/38 |
| | | | | 725/100 |
| 2009/0133047 A1* | 5/2009 | Lee | ........................... | A61B 5/16 |
| | | | | 725/10 |
| 2011/0214141 A1* | 9/2011 | Oyaizu | ................... | H04N 7/173 |
| | | | | 725/12 |
| 2014/0070957 A1* | 3/2014 | Longinotti-Buitoni | ...................... | |
| | | | | A61B 5/02055 |
| | | | | 340/870.01 |
| 2014/0317673 A1* | 10/2014 | Murugan | ............ | H04L 12/1895 |
| | | | | 725/116 |
| 2015/0032658 A1 | 1/2015 | Pantaliano et al. | | |
| 2016/0142767 A1* | 5/2016 | Shigeta | .............. | H04N 21/4788 |
| | | | | 725/12 |
| 2018/0146262 A1* | 5/2018 | Murugan | ......... | H04N 21/41415 |
| 2018/0146282 A1 | 5/2018 | Murugan | | |
| 2018/0364810 A1 | 12/2018 | Parshionikar | | |
| 2019/0088093 A1 | 3/2019 | Gervais et al. | | |
| 2019/0200085 A1* | 6/2019 | Merced | .................. | G16H 40/40 |
| 2020/0154166 A1* | 5/2020 | Rakshit | .............. | H04N 21/2187 |
| 2022/0116463 A1* | 4/2022 | Price | ..................... | H04L 65/611 |

\* cited by examiner

Receiving signals
transmitted from a
plurality of user input
devices

In response thereto and
in real time or near real
time, controlling at least
one output device
located at the live event
to provide an audio
and/or visual output to
people at the live event

REMOTE ENGAGEMENT SYSTEM

FIELD OF THE INVENTION

Embodiments of the invention provide a remote engagement system and methods of using the same which allows for the display of physical reactions of remote viewers at the venue of a live event.

BACKGROUND OF THE INVENTION

An unobtrusive system that allows remote viewers of live events to convey support or discontent to participants such as sports teams, sports personalities, entertainers etc. and to engage with the live audience and/or the aforementioned participants to join in elation, appreciation, support, dissatisfaction and jeers at various incidents occurring at the live event is needed. U.S. patent application Ser. No. 2014/0317673, herein incorporated by reference, provides a remote engagement system, however, the system requires remote viewers to actively input desired responses which distracts from viewing the event.

SUMMARY

Embodiments of the disclosure provide a remote engagement system that records the physical movements of remote viewers, e.g. hand and arm gestures, which may be output at the venue of a live event.

An aspect of the disclosure provides a remote engagement system for a live event occurring at a venue, comprising: at least one output device located at the venue or located remotely from the venue, said at least one output device providing an audio and/or visual output to at least one recipient located at the venue or remote from the venue; and a controller for (i) receiving a plurality of signals each of said plurality of signals being representative of a physical reaction of a remote viewer of the live event, said signals being transmitted from a plurality of user input devices located remotely from each other and from the venue; and (ii) controlling the at least one output device to display an audio and/or visual output representative of at least some of the plurality of signals received from the plurality of user input devices.

In some embodiments, the physical reaction comprises one or more of hand and arm gestures, heart rate, and yelling. In some embodiments, the physical reaction comprises hand and arm gestures and the controller controls the at least one output device to display an audio and/or visual output representative of the number of remote viewers performing different gestures. In some embodiments, the physical reaction comprises heart rate and the controller controls the at least one output device to display an audio and/or visual output representative of a range of detected heart rates. In some embodiments, the physical reaction comprises yelling and the controller controls the at least one output device to display an audio and/or visual output representative of a range of detected yelling volumes in decibels.

In some embodiments, a plurality of the user input devices are mobile phones, smart wristbands, and/or smart jerseys. In some embodiments, the venue is a stadium. In some embodiments, the at least one output device comprises one or more display screens on a wall of the stadium. In some embodiments, the live event is broadcast on the radio, televised, and/or streamed over the internet and the at least one output device further comprises a plurality of remote devices that are different from the plurality of user input devices.

In some embodiments, the system further comprises the plurality of user input devices located remotely from the venue for receiving a user input and in response thereto transmitting a signal in real time or near real time over a communications network. In some embodiments, the at least one output device comprises one or more speakers that output a sound.

Another aspect of the invention provides methods of using a system as described herein.

Additional features and advantages of the invention will be set forth in the description below, and in part will be apparent from the description, or may be learned by practice of the invention. The advantages of the invention can be realized and attained by the exemplary structure particularly pointed out in the written description and claims hereof as well as the appended drawings.

DETAILED DESCRIPTION

Referring to the accompanying Figures, a remote engagement system 10 for a live event is illustrated. Embodiments of the disclosure provide a remote engagement system 10 for a live event occurring at a venue which includes an output device 12 located at the venue for providing an audio and/or visual output to at least one recipient located at the venue. A controller receives signals representative of a physical reaction of remote viewers of the live event transmitted from a plurality of user input devices located remotely from each other and from the venue and controls the output device located at the venue to display an audio and/or visual output representative of at least some of the plurality of signals received from the plurality of user input devices.

A system as described herein allows for fans watching a live event occurring at a venue, e.g. on television or over the internet, to passively transmit their immediate physical reactions in response to actions occurring at the venue. The system counts the different types of physical reactions and allows for a representation of the reactions, for example, to be displayed on a large screen (e.g. projected on a wall of the venue) such that those within the venue may view the reactions of remote viewers. In some embodiments, the representation of the collected reactions may be displayed, for example, on a television or streaming broadcast of the live event such that other remote viewers may also view the reactions of others.

Figure 1:
FIG. 1. An illustrative embodiment of a method of using a remote engagement system.

FIG. 1 provides an exemplary embodiment of a method of using a remote engagement system according the invention. In some embodiments, the method comprises (i) receiving a plurality of signals each of said plurality of signals being representative of a physical reaction of a remote viewer of the live event, said signals being transmitted from a plurality of user input devices located remotely from each other and from the venue; and (ii) controlling at least one output device located at the venue to display an audio and/or visual output representative of at least some of the plurality of signals received from the plurality of user input devices.

Figure 2:
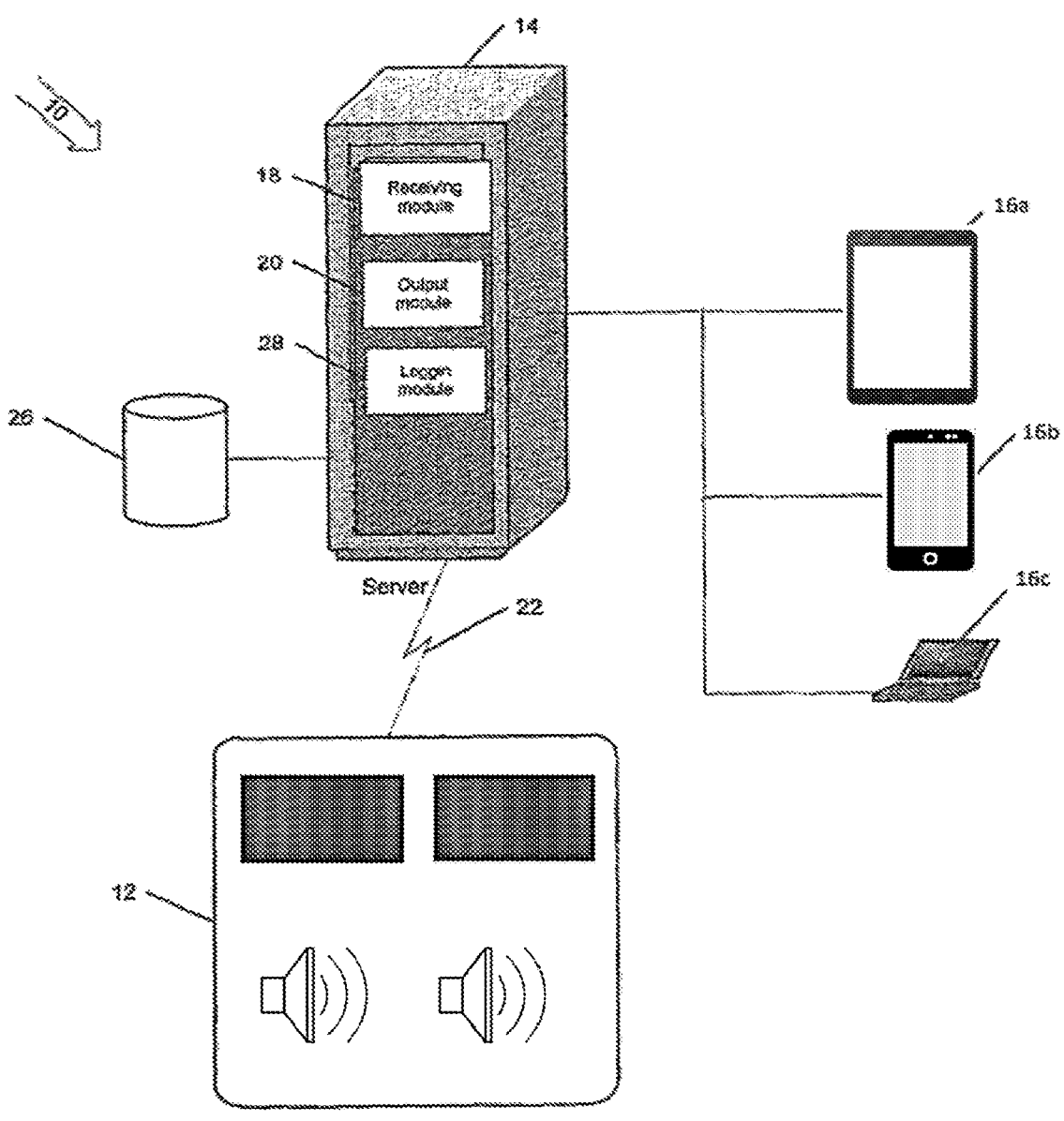
FIG. 2. An illustrative embodiment of a remote engagement system.

In FIG. 2, a remote engagement system 10 for a live event is illustrated. The live event could be any live event such as a sporting event, a live performance, a rally having one or more speakers, etc. The live event may occur at a stadium, concert hall, theater, television studio, or any other venue suitable for live events.

The system 10 includes at least one output device 12 located at the live event for providing a visual and/or audio output to people at the live event. In some embodiments, the output device 12 may comprise remote devices that are remote from the venue and from each other, such as radios, televisions, computers, tablets, mobile phones through which a broadcast of the live event may be viewed/heard, e.g. at websites, such as social media sites; at fan's homes; or at public venues such as bars or restaurants. The at least one output device 12 could be one or more video resources in the form of display screens and/or one or more audio resources in the form of speakers.

In some embodiments, the output device may comprise a display screen mounted or projected onto a wall of a stadium, e.g. inside the tunnel that athletes pass through before taking the field. The tunnel may be a permanent fixture of the stadium or a non-permanent, removable tunnel, such as an expandable tunnel. In some embodiments, there may be two output devices, one for each team which displays reactions from fans of each team.

Figure 3A:
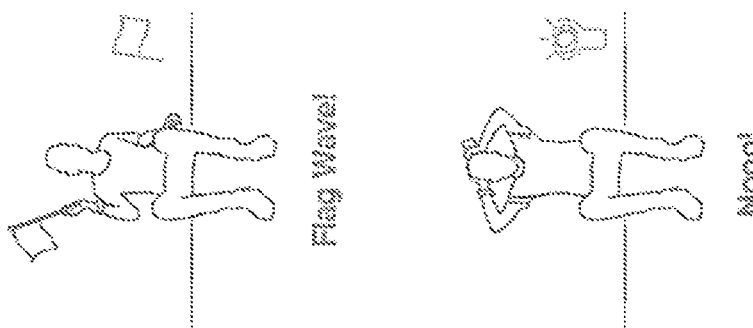
FIG. 3A. Exemplary hand and arm gestures compatible with an embodiment of the remote engagement system.
Figure 3A:
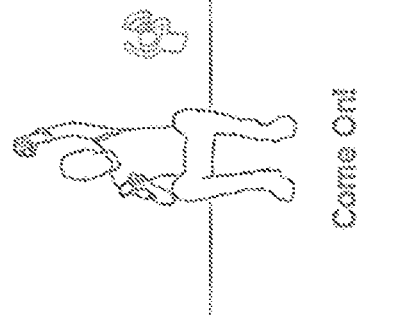
Figure 3A:
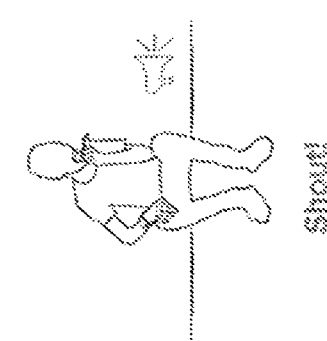
Figure 3A:
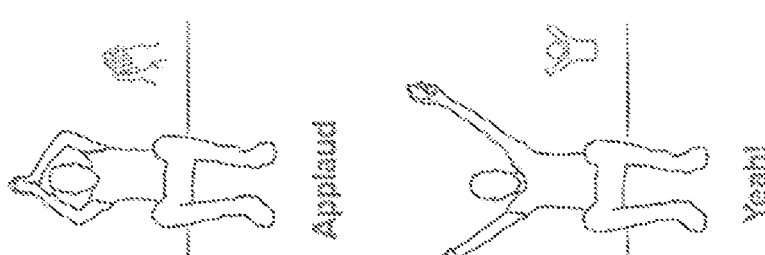
Figure 3B:
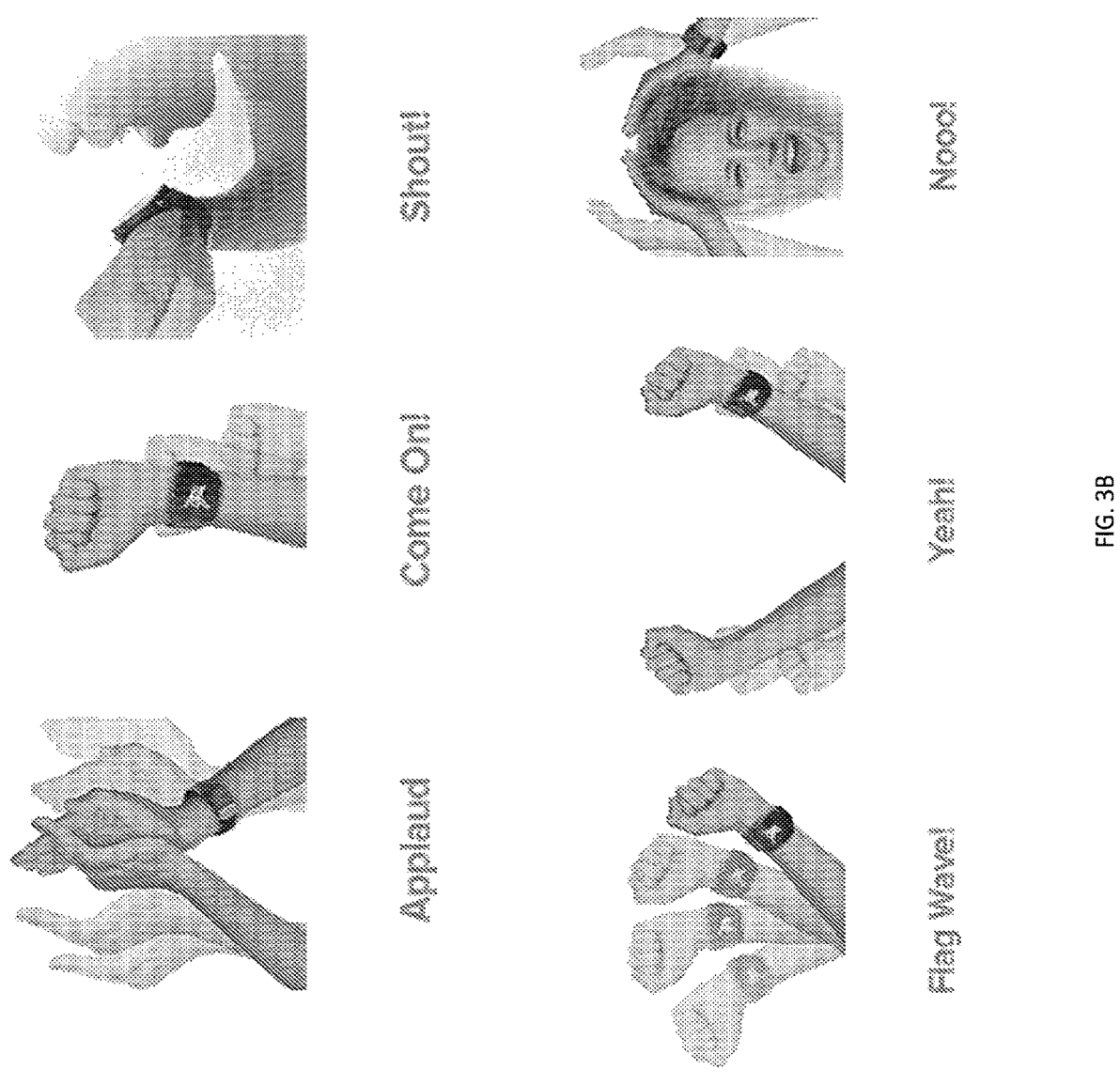
FIG. 3B. An alternative illustration of exemplary hand and arm gestures compatible with an embodiment of the remote engagement system.

FIG. 3A-B shows exemplary hand and arm gestures that may comprise the physical reactions that are transmitted by the system. For example, a fan watching a live event remotely may wear a smart watch or other input device, e.g. a mobile phone held in the hand of the user, that is able to detect certain hand and arm gestures such as applause, a standing ovation, one or more arms raised in celebration, flag waving, or one or more hands on the head as a sign of distress or frustration. Such devices generally have some form of motion sensor, accelerometer, gyroscope, magnetometer, altimeter, etc. that is used to detect the directional movement of the device. In some embodiments, the input device is a device which is worn on the wrist or arm of a user and is pre-programmed to detect certain hand and arm gestures. In some embodiments, the input device is able to detect and transmit the heart rate of the user.

In some embodiments, the input device is a garment, such as one or two gloves that the viewer wears that measures when the viewer is clapping or performing another gesture and transmits an appropriate message. The glove may have pressure sensors therein or include a circuit that is shorted when the user makes a certain movement. For example, if the user clenches their fist this may indicate clapping. Alternatively, actual clapping is measured.

Figure 4:
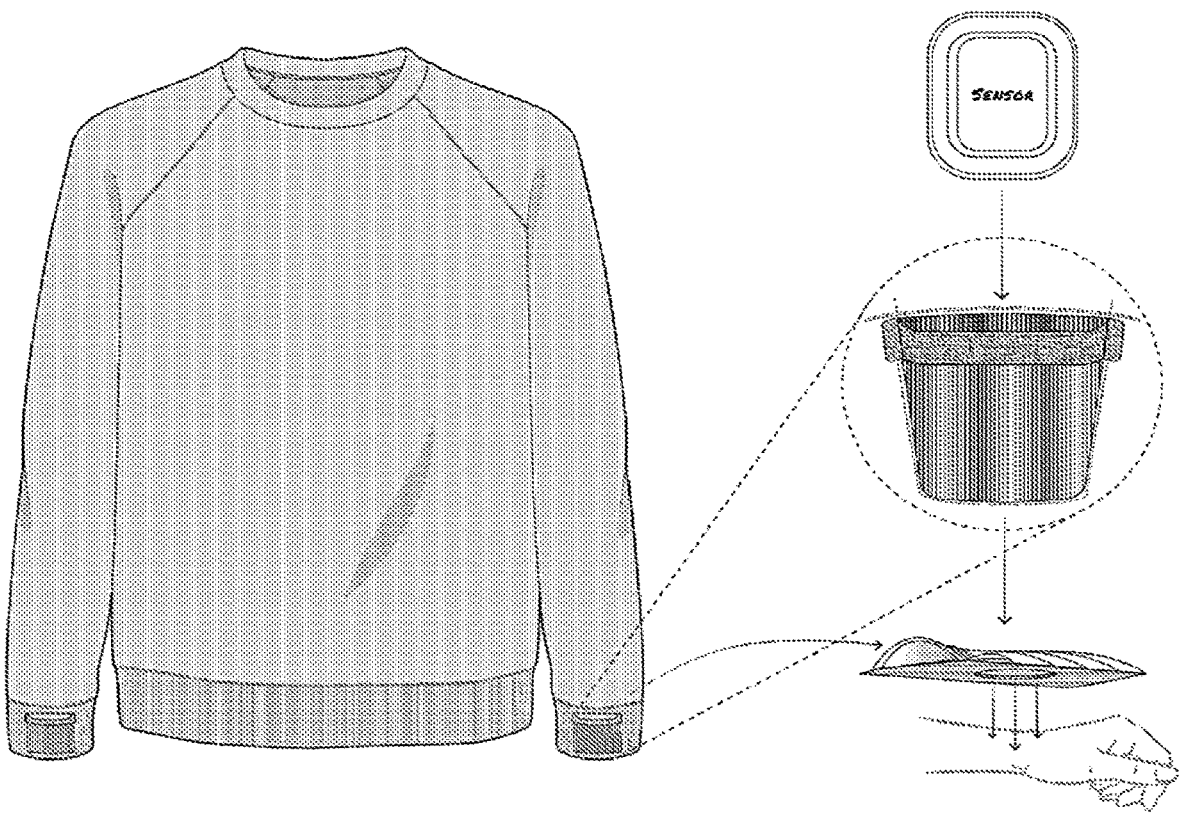
FIG. 4. A long-sleeved smart jersey according to an embodiment.
Figure 5:
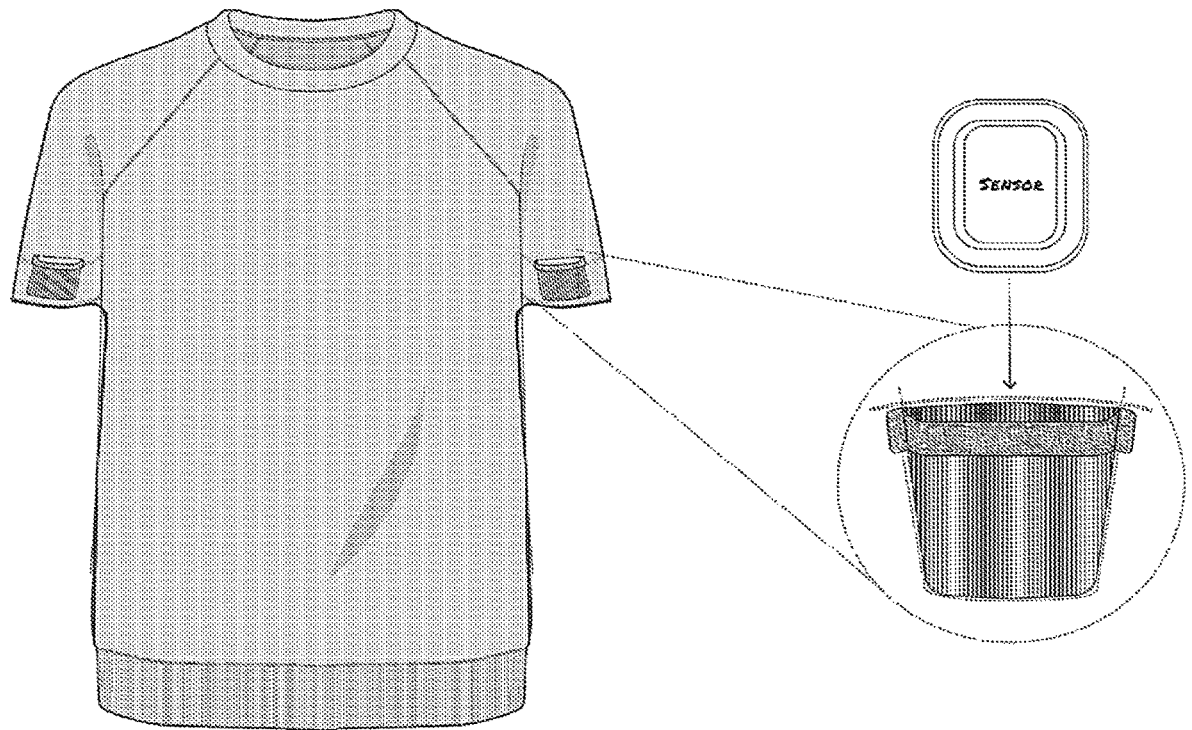
FIG. 5. A short-sleeved smart jersey according to an embodiment.

In some embodiments, the input device is a shirt, e.g. a jersey from the wearer's favorite sport's team, containing one or more sensors. For example, the input device may be a long-sleeved jersey having a pocket/pouch near the cuff or wrist portion of one or both sleeves, wherein the pocket contains a sensor for determining the gestures of the wearer (FIG. 4). The pocket may be located such that the sensor is arranged at or near the volar side (palm side) of the wrist or at or near the dorsal side (back side) of the wrist. In some embodiments, the pocket contains an opening such that the sensor may directly contact the skin of the wearer, e.g. to detect heart rate. In some embodiments, the input device is a short-sleeved jersey having a pocket at the end of one or both sleeves, wherein the pocket contains a sensor for determining the gestures of the wearer (FIG. 5). The pocket may have a sealable opening, e.g. using a zipper or hook and loop fastener, that allows for removal of the sensor, e.g. for charging the sensor or to wash the jersey. In some embodiments, the sensor is waterproof such that it does not need to be removed when washing the jersey. The sensor may be recharged, e.g. through wireless charging, or by replacement of the battery, e.g. a coin cell battery.

Figure 6:
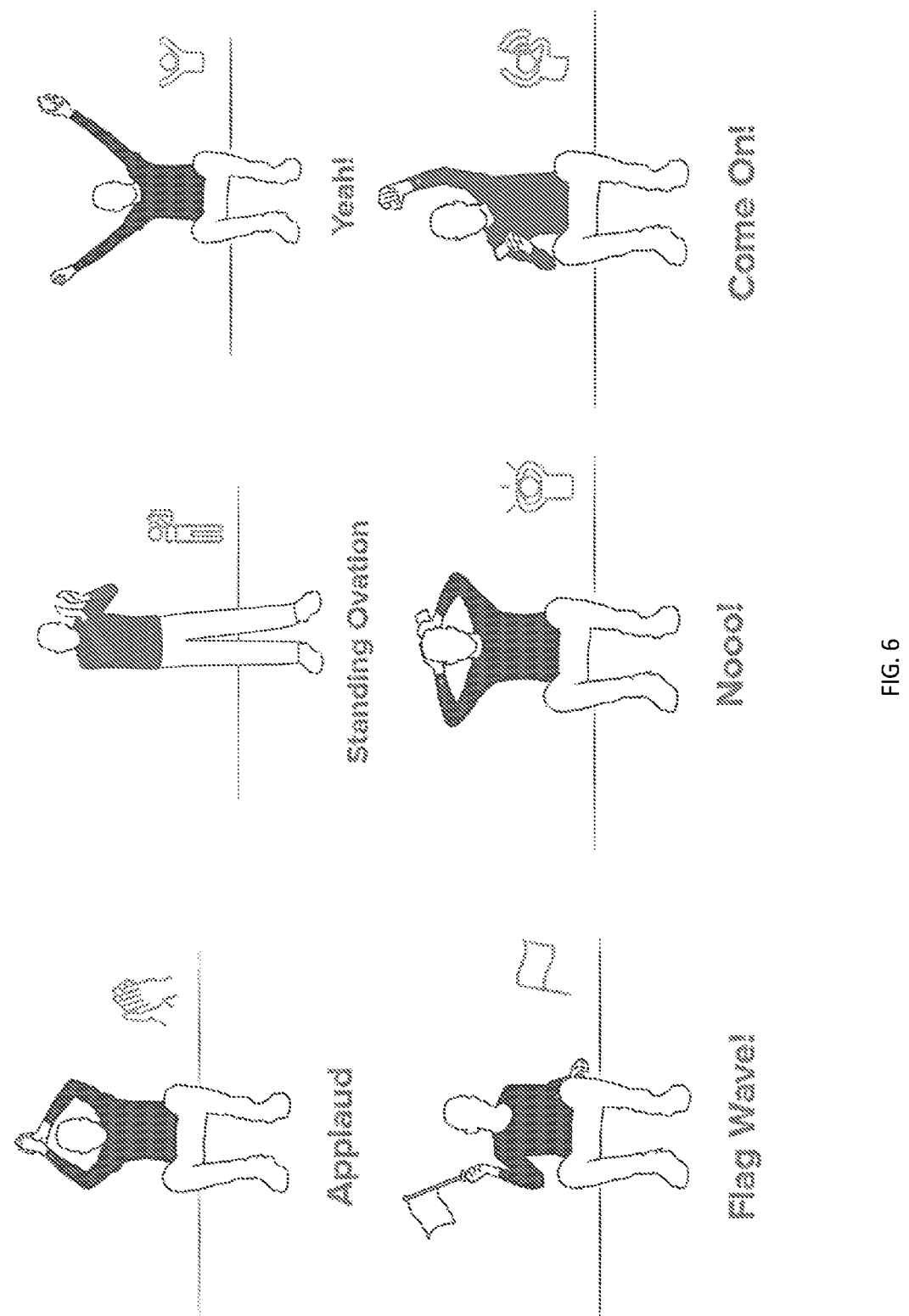
FIG. 6. Exemplary hand and arm gestures compatible with an embodiment of the smart Jersey.

Exemplary hand and arm gestures that may be detected using a jersey input device as described herein are shown in FIG. 6. Custom gestures and new gestures can also be recognized or coded to expand or customize the fan language, e.g. for different teams, for new global digital rituals to be created.

Figure 7:
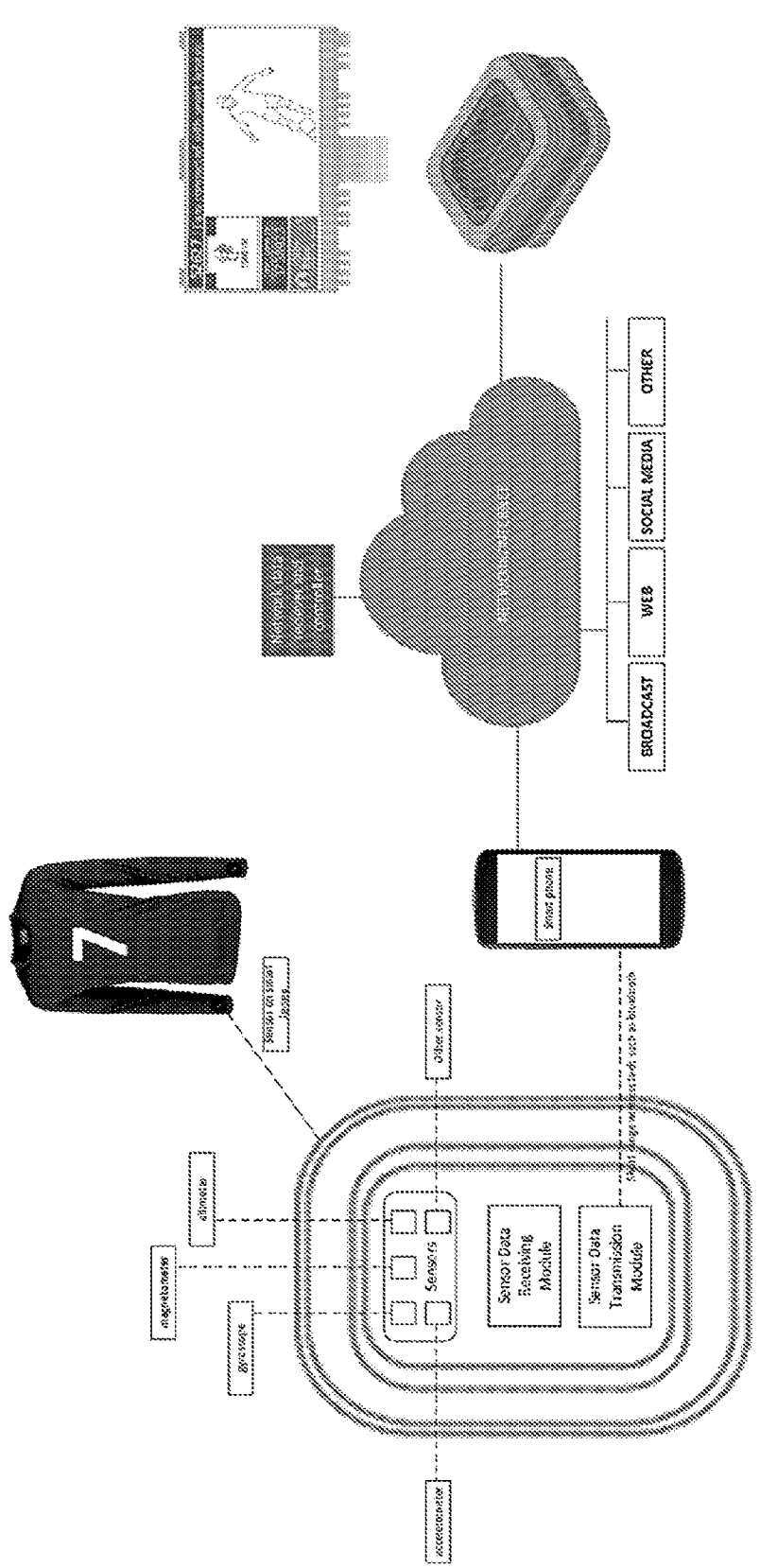
FIG. 7. A remote engagement system according to an additional embodiment.

With reference to FIG. 7, data from the sensors in the smart jersey or other input device may be sent to a sensor unit controller for processing and/or transmission to one or more paired devices. The gesture data controller which can a software-based controller can be a part of the sensor unit on the garment that interprets the sensor data and recognizes gestures. In other embodiments, the controller that receives the sensor data for gesture recognition is on a mobile device such as a mobile smart phone. Device pairing, connectivity, and data communication may be achieved by a short-range wireless technology such as Bluetooth. In some embodiments, the controller may be part of a mobile application that runs on a mobile phone, tablet, PC, or any internet-enabled device that supports the installation of third-party software. In some embodiments, a thread motion interpretation controller receives data and sends data to a gesture recognition controller which then sends the gesture data over the internet to relevant locations.

In some embodiments, the sensors in the input device recognize when a user is wearing the device, e.g. a watch, jersey, gloves, etc. A parameter may be flagged on a sensor module and a value sent via a network module for a real time count of devices being worn which may serve as useful content for teams, fans, and broadcasters. A signal may be sent to a remote visual output device that displays a count of all of the input devices being worn at that time. The count can be displayed at a live event in a stadium, fed into broadcast, displayed on a webpage or mobile application, shown on a screen in a prominent public space, etc.

In some embodiments, the input device contains a microphone and is able to detect and transmit the volume of yells or shouts of the user. In some embodiments, the system distinguishes yelling that is positive, e.g. cheering, from that which is negative, e.g. booing. When fans yell in a stadium, their combined yell volumes can be represented in a single decibel value as they are all in the same vicinity. The remote viewers/fans yelling are contained to where they are. A system as described herein may provide for a linear addition of all the remote viewers/fans yell volumes to be represented as a single unit which increments linearly. In some embodiments, the controller controls the at least one output device to display an audio and/or visual output representative of at least one of a range of detected yelling volumes in decibels, an average volume in decibels of detected yelling, and a combined total volume represented in decibels of detected yelling.

In some embodiments, the input device is incorporated into a flag and thus can detect movements of the flag when waved. In some embodiments, the input device comprises a television, computer, video game system or other device equipped with a camera that can detect the movements and gestures of a remote user viewing the live event. Such a device may also contain a microphone for recording the volume of shouting.

A system according to embodiments of the disclosure allows for the passive collection of the physical reactions of remote users. In general, the only active input required by the remote user is the initial connection or log-in to the application, web application or other service that is used to collect and transmit signals. For example, the remote user may activate the application as they begin watching the live event and the system then provides for the automatic collection and transmittal of physical reactions as the remoter user watches the event. The user may also inactivate the application to stop the collection and transmittal of signals from the input device or the application may automatically inactivate after a certain period of time, e.g. at the end of the live event.

A system according to embodiments of the disclosure allows for counting the number of people performing certain actions, e.g. various hand and arm gestures, and for displaying the numbers on an output device at a venue and/or on a broadcast of the live event. In some embodiments, the output device 12 displays the type of physical reaction that is transmitted from a plurality of user input devices at different locations on the one or more display screens depending on the type of reaction. For example, one designated area on the screen will display the number of fans applauding while another designated area will display the number of fans raising their arm to signal "Come On!". In some embodiments, the output device 12 displays the number of fans contributing a heart rate and the average rate of the fans' heart rate.

In some embodiments, each sports team may have a designated area on the screen of the output device where the reactions of remote viewers identified as fans of that team are displayed. For example, a remote engagement system as described herein may be used at venues containing events associated with the Olympic games. The output device may display the number of fans cheering or jeering and the location of such fans. Thus, it is contemplated that there could be contests among different countries as to which country has the most fans cheering on their Olympic team, e.g. by waving flags, shouting, and/or performing hand or arm gestures. In some embodiments, the output device displays the volume of yelling or shouting in decibels and thus there could be contests as to which team, state, or country has the loudest fans.

A system according to embodiments of the disclosure may also include a web-based application that can be run on any device, e.g. a mobile phone, television, tablet, computer, smart watch, etc., that outputs the same audio and/or visual output that is transmitted to the output device located at the venue and further allows a user of the application to identify and track certain other users, e.g. friends in a social network, to monitor their specific reactions to the live event. In some embodiments, signals representative of a physical reaction of a remote viewer may be transmitted directly to a social media profile that is shared with others on the social media website.

Exemplary visual output may be a visual indication of a dial with a needle that moves up and down depending on the inputs received. The needle could move dynamically as the inputs change so that the needle will be moving up and down as the amount of inputs increase and decrease, e.g. in response to the number of fans applauding or the volume of cheers. In another example, the visual output could include a graphic indicator of a happy or sad person with a related number or graph showing how many happy or sad inputs have been received. It is envisaged that this will also dynamically change as the number of inputs alter.

It will be further appreciated that in some embodiments both audio and visual outputs could be used where for example, and applause sound is played via speakers to the crowd whilst the display indicates the level of applause received.

In embodiments in which the output device at the venue includes an audio output, ambient noise sensors at the event in one embodiment are used to ensure that the audio output is matched to the ambient noise at the venue. Thus, if the venue crowd is quiet the audio output will be relatively lower whereas if the venue crowd is noisy the audio output will be relatively higher.

Figure 10:
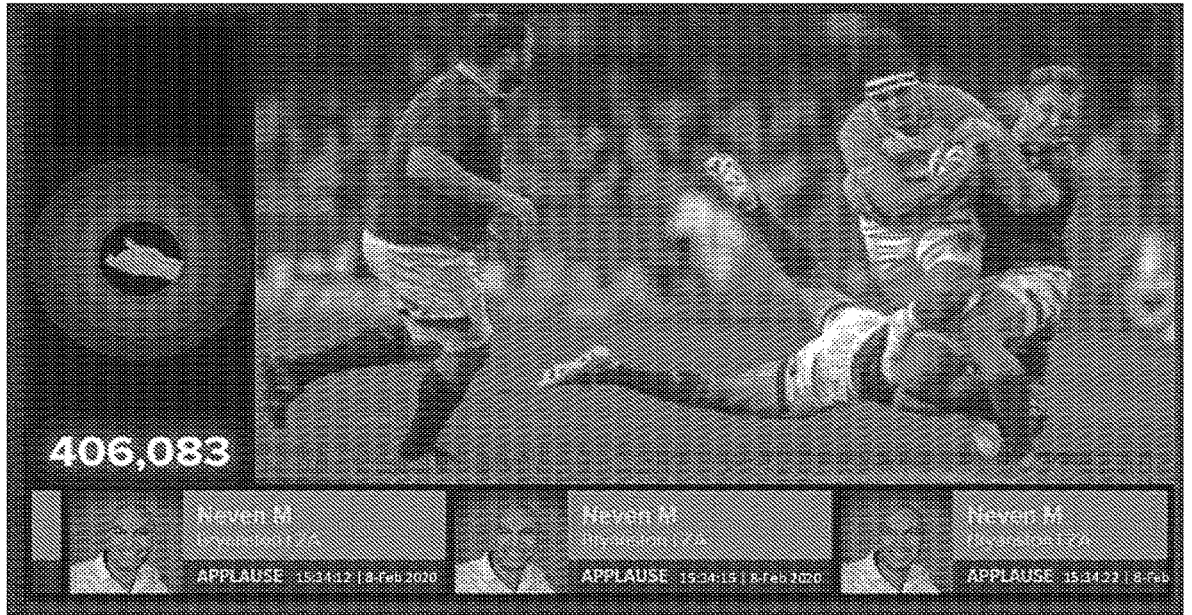
FIG. 10. An illustrative embodiment of an input and/or output device.

Embodiments of the disclosure encompass systems and methods wherein the output device is located remotely from the venue. The output device may thus be the same or different from the user input device. FIG. 10 shows the display screen of a device that may encompass an input and/or an output device. For example, the display of FIG. 10 may represent the display of an input device such as a mobile phone, a smart wristband, or a television with accompanying camera for detecting gestures. Thus, a portion of the screen may visualize the current physical reaction being performed by the user, e.g. applause. The same device may also be used as a remote output device which, for example, displays the physical reactions of other remote users (see bottom portion of the display of FIG. 10). Thus, as a remote user is viewing a broadcast of the live event and transmitting their physical reactions through an input device, the user can also view the reactions of other remote users either on the same or a different device.

As shown in FIG. 2, the system includes a controller in the form of server 14 that is arranged to receive signals transmitted from a plurality of user input devices 16a-16c, the signals being transmitted from a plurality of user input devices located remotely from each other and from the venue. In response thereto and in real time or near real time, the controller controls the at least one output device 12 to output at least some of the plurality of physical reactions received from the plurality of user input devices 16a-16c, wherein the recipients at the venue or recipients watching/listening to a broadcast are provided an audio and/or visual output of at least some of the physical reactions of remote viewers.

In some embodiments, at least some of the user input devices are operable only by a single user at a time of a plurality of users. The system may further comprise the plurality of user input devices located remotely from the venue for receiving a user input and in response thereto transmitting a signal in real time or near real time over a communications network. Examples of user input devices include, but are not limited to, mobile smart phones 16*b* or tablet 16*a,* desktop, or laptop 16*c,* computers or wearable devices such as a smart watch or fitness tracker worn on the wrist of a user, or video game systems or other devices having cameras capable of tracking the movement and/or voice level of a user. The plurality of input devices 16*a*-16*c* are located remotely from the live event. Thus, it will be typically located at a place where viewers are watching the live event remotely, for example by television or streaming over the internet.

In the example of the smart watch, signals representative of a physical reaction of the user are transmitted over a communications network in the form of the internet from the smart watch to a receiving module 18 of the server 14. The server 14 has a database 26 associated therewith for storing data.

Alternatively, or in addition, TVs are built with options and accessories to engage with audio and video resources at events. As an example, a TV with live resource engagement options would be able to deliver the live images and/or sounds from a remote location to an event.

The server 14 includes a number of modules to implement an example embodiment. In one example embodiment, the modules described below may be implemented by a machine-readable medium embodying instructions which, when executed by a machine, cause the machine to perform any of the methods described above.

In another example embodiment, the modules may be implemented using firmware programmed specifically to execute the method described herein.

It will be appreciated that embodiments of the present invention are not limited to such architecture, and could equally well find application in a distributed, or peer-to-peer, architecture system. Thus, the modules illustrated could be located on one or more servers operated by one or more institutions.

It will also be appreciated that in any of these cases the modules form a physical apparatus with physical modules specifically for executing the steps of the method described herein.

The server 14 includes an output module 20 to control the output devices 12 to provide the visual and/or audio output through the output device 12. The server 14 is typically connected to the output device 12 via a communications network 22 which may be hardwired or a wireless network. The output module 20 manages the output at the event so that the visual and/or audio output provided is related to the signals received from the plurality of input devices 16*a*-*c.*

Thus, using a system as described herein, fans will be able to transmit their physical reactions to an event in real time or near real time from anywhere that has the necessary network connectivity (such as internet connectivity).

The controller in the form of server 14 will receive resource requests and manage output to resources. The controller functions include, but are not limited to, the following:
 1. Video and Sound Filtering
 2. Max sound volume
 3. User engagement logging
    a. Points tallying for loyalty services
    b. Verification of user engagement
    c. Timeless record of engagement
    d. Location based services
    e. Fan leaderboard services
    f. Visualization of user engagement services
 4. Scheduling and blending engagement services
 5. Distribution, by load etc.
 6. Advanced features A logging module 28 logs all user activities. The logs will be available to users on request to verify remote participation. Additionally, a points scheme can be derived for fan activity on the system. Points will be tallied for loyalty services and competitions.

The logging module 28 may log the time a user activity is performed, and that activity may be displayed on a "vibe board" at the event. Thus, if a user claps, jumps, shouts, etc., that activity can be displayed, preferably with a time stamp, with an image of the user (see FIG. 10). The time stamping helps differentiating fans, as a fan of one team may be ecstatic with the outcome of a referee's call, while fans of the other team may be more than a little disappointed. Thus, the vibe board displays which fans are doing what activities, and preferably associates these activities with a time stamp. This can be further enhanced by the display of FIG. 10 including avatars which perform the same acts as the user. For example, if a fan jumps up, the displayed avatar will jump up, and if a fan claps or yells, the avatar will be shown clapping and yelling. This can be accomplished by a number of sensors. As discussed in FIG. 3*b,* a wrist watch can be used to sense hand motions. In addition, there are now available shirts and pants with built in sensors for measuring heartbeat, perspiration, and movement of the user. These sensors can individually transmit data to the computer system operating with this remote engagement system, or could broadcast the data by Bluetooth or other wireless technology to their cell phone which, in turn, would wirelessly, provide the information to the computer system. For example, sensors in the shirt and pants of the individual in FIG. 3A may detect all the motions and many others (dances, rolling over, running, etc.) and this information could then be reflected on the vibe board at the stadium as shown in FIG. 10. Furthermore, in some embodiments the vibe board itself by be videostreamed so that users looking at their devices (cell phones, tablets, laptops, etc.) could be able to sense the vibe of the event by being provided with information (e.g., avatars dancing, decibel levels measured for individual and aggregate fans that are yelling, an indication that a fan is applauding or yelling, etc.) while the event takes place remotely.

Figure 8:
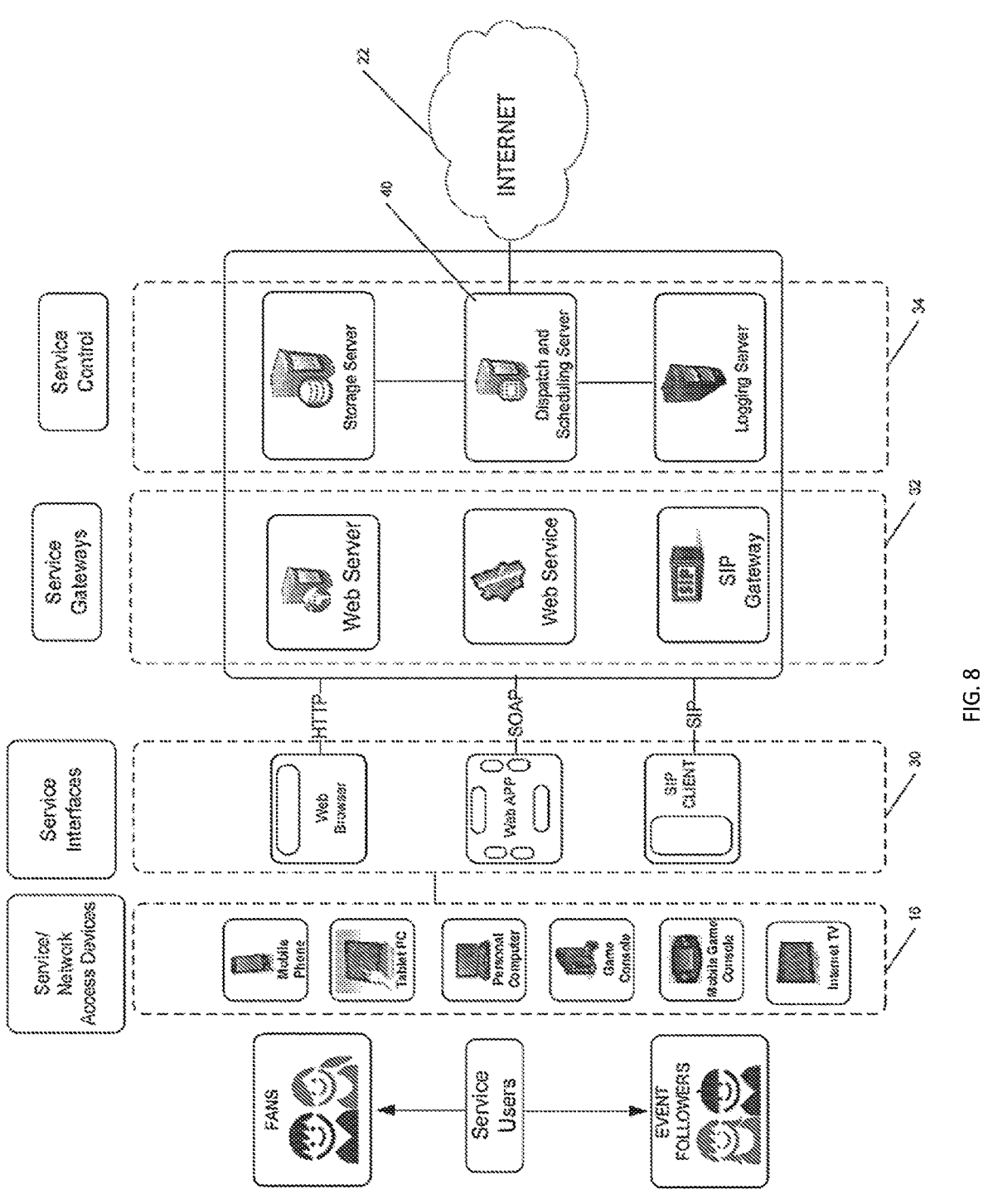
FIG. 8. A remote engagement system according to an additional embodiment.
Figure 9:
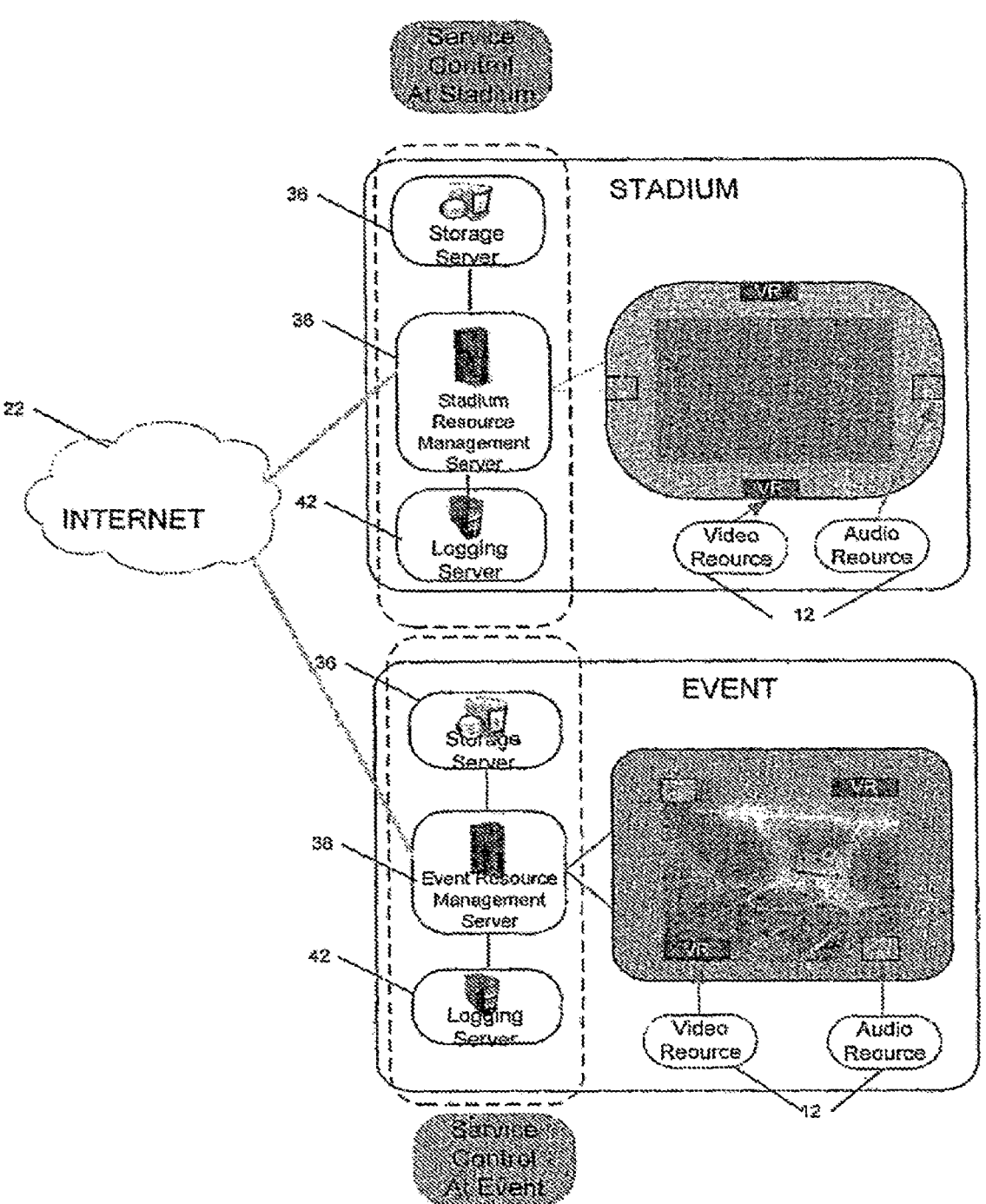
FIG. 9. A remote engagement system according to an additional embodiment.

Referring to FIGS. 8 and 9, an example embodiment of the invention is described in more detail. A user accesses a service request input web page via a web browser 30 on a web server 32 using HTTP over a network such as the Internet. It will be appreciated that the network can be the Internet and/or another IP based network for example a GSM based network or other type of network that facilitates the access of resources remotely. The accessed web page has HTML input elements such as buttons. The web page is prepared in a version of HTML that can include HTML version 5 and future HTML versions. Alternatively, input options for services are requested via a custom application that accesses a custom Web Service over a network such as the Internet. The Web Service has access to output resources at a Sports Venue or Event Location. Web Service standards and protocols are used in developing the system.

The application is typically developed in Java to facilitate easier access to input device components such a microphone. The applications can be also developed in other languages including C++. Services initiated or requested via the application are typically delivered via a Web Service. The remote access device running the application uses XML, HTTP and/or SOAP (Simple Object Access Protocol)

to make requests from the application, to activate services. Other Web Service platform elements such as WSDL are also used where necessary.

The input options on the web page or application are engaged to initiate audio, video and graphics based services over a network such as the Internet.

In some embodiments, generic recorded sounds may be linked to certain physical gestures, e.g. the sound of clapping when the remote user applauds, which are then transmitted along with the signals representative of the physical reaction. Other pre-recorded sounds may include the sound of cheers, booing, sighs, etc. Sound files are stored in a storage service 36 at the event or stadium and is linked to an event/stadium resource management server 38. This reduces network traffic and bandwidth utilization for the service. The event/stadium resource management server 38 and sound files can also be off site but must maintain network connectivity to the audio and video resources 12 over a network such as the Internet. In some embodiments, the event/ stadium resource management server 38 fulfills at least part of the function of the output module 20 of FIG. 2.

When an input option is engaged by the user, a software service request instruction is prepared depending on the service type requested and sent to a dispatch and scheduling component that resides on a dispatch and scheduling server 40. In a typical deployment, the web server component and dispatch and scheduling server component will be installed on the same server. The dispatch and scheduling server can receive: a single service request instruction from a user, multiple service requests from a single user, a single service request from multiple users, or multiple service requests from multiple users.

The dispatch and scheduling server 40 aggregates requests and schedules delivery of requests to an event/ stadium resource management server 38. Thus, it will be appreciated that in this embodiment the server 14 illustrated in FIG. 2 is distributed over a plurality of servers.

Requests are delivered from the dispatch and scheduling server 40 to the event/stadium resource management server 38 over an IP based network. TCP, UDP and SCTP (Stream Control Transmission Protocol) are used to manage delivery of requests depending on service type. Services also make use of SIP (Session initiation Protocol) where necessary to improve effectiveness.

The event/stadium resource management server 38 receives the aggregate service requests, unpacks and interprets the requests, and passes instructions to audio, video and other resources 12 depending on the services requested.

A user's activity is logged on a logging server 42 that is linked to the event/stadium resource management server 38 for verification and additional services such as points for participation for users.

The event/stadium resource management server 38 is typically connected to the audio resource 12, video resource 12 and any other resources in one of the following ways: via an IP based network, via wireless protocol based access at the event/stadium, via cables, or audio resources can have additional components such as amplifiers and sound filters.

A live service enables users to transmit live reactions remotely to an event or stadium by using the necessary networked enabled devices and software. A live service user accesses a live service application (Web App) that is installed on an Internet enabled device 16 such as a smart phone, smart watch, or tablet PC, for example. The Web App can in part be a SIP (Session Initiation Protocol) client or must be able to access a SIP client on the Internet enabled device.

This is to establish connectivity to a SIP Gateway appliance over an IP network such as the Internet to be able to access and use the live sound service at the event or stadium.

In some embodiments, the live sound service operates similarly to a large-scale push to talk over IP service. The live visual and/or audio media is delivered using RIP (Real Time Protocol) and SRTP (Secure Real Time Protocol) where necessary. Other real-time data delivery protocols will be utilized when necessary to improve the effectiveness and efficiency of the system. Where necessary also, the signaling and live visual and/or audio media passes through the event/stadium resource management server 38 to access the video and/or audio resources 12 at an event or stadium.

A live service user can also activate the live service via a web page. An input control button on the web page when activated uses the camera and/or microphone of the network access device to transmit live video and sound. SIP and RTP or SRTP is typically used to establish connectivity to visual and audio resources at an event or stadium to deliver the live media in real time.

Communication between the dispatch and scheduling server and the event/stadium resource management server is established over a network that is IP based with UDP, TCP and/or SCTP managing data flow. SIP and RTP will be used when necessary to improve the effectiveness and efficiency of the service.

An event or stadium can have multiple groups of event/ stadium resource management servers linked to multiple groups of resources to support more than a 100 million service users or more concurrently if necessary and improve resiliency. Similarly, multiple service gateways dispatch and scheduling servers and other system elements can also be deployed for a stadium or event to improve system resiliency to increase service and user concurrency.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A remote engagement system for a live event occurring at a venue, comprising:
   at least one output device located at the venue, said at least one output device providing an audio and/or visual output to at least one recipient located at the venue; and
   a controller for
   (i) receiving a plurality of signals each of said plurality of signals being representative of a physical reaction of each of a plurality of remote viewers that are remote from the venue, wherein said signals are generated from physical reactions of each of the plurality of remote viewers using detectors worn by each of the plurality of remote viewers, wherein said detectors are associated with at least one of a wristband, smartwatch, or shirt worn by each of the plurality of remote viewers, wherein said controller is configured to transmit said signals from the detectors to the at least one output device; and
   (ii) controlling the at least one output device located at the venue to display an audio and/or visual output representative of at least some of the plurality of signals received from the detectors, wherein the audio and/or visual output corresponds to one or more of
   a heart rate of one or more of the plurality of remote viewers,
   an indication that one or more of the plurality of remote viewers has raised one or more arms; and
   an indication that one or more of the plurality of remote viewers has executed a particular movement or signal with their hands that is not applause and is different from raising their arms.

2. The system of claim 1, wherein the physical reaction further comprises yelling.

3. The system of claim 1, wherein the indication includes one or more of placing one or more hands on their head, waving a flag, and making a fist.

4. The system of claim 1, wherein the physical reaction comprises heart rate and the controlling step comprises controlling the at least one output device to display an audio and/or visual output representative of at least one of a range of detected heart rates, a number of remote viewers contributing a heart rate, and an average remote viewer heart rate.

5. The system of claim 1, wherein the physical reaction further comprises yelling and the controller controls the at least one output device to display an audio and/or visual output representative of at least one of a range of detected yelling volumes in decibels, an average volume in decibels of detected yelling, and a combined total volume of detected yelling.

6. The system of claim 1, wherein the venue is a stadium.

7. The system of claim 6, wherein the at least one output device comprises one or more display screens on a wall of the stadium.

8. The system of claim 1, wherein the live event is broadcast on a radio, televised, and/or streamed over the internet and wherein the at least one output device further comprises a plurality of remote devices that are different from the plurality of user input devices.

9. The system of claim 1, further comprising the detectors located remotely from the venue for receiving a user input and in response thereto transmitting a signal in real time or near real time over a communications network.

10. The system of claim 1, wherein the at least one output device comprises one or more speakers that output a sound.

11. A remote engagement method for a live event occurring at a venue, comprising:
   (i) receiving a plurality of signals each of said plurality of signals being representative of a physical reaction of each of a plurality of remote viewers that are remote from the venue, wherein said signals are generated from physical reactions of each of the plurality of remote viewers using detectors worn by each of the plurality of remote viewers, wherein said detectors are associated with at least one of a wristband, smartwatch, or shirt worn by each of the plurality of remote viewers, wherein said controller is configured to transmit said signals from the detectors to the at least one output device; and
   (ii) controlling at least one output device located at the venue to display an audio and/or visual output representative of at least some of the plurality of signals received from the detectors, wherein the audio and/or visual output corresponds to one or more of
   a heart rate of one or more of the plurality of remote viewers,
   an indication that one or more of the plurality of remote viewers has raised one or more arms; and
   an indication that one or more of the plurality of remote viewers has executed a particular movement or signal with their hands that is not applause and is different from raising their arms.

12. The method of claim 11, wherein the physical reaction further comprises yelling.

13. The method of claim 11, wherein the indication includes one or more of placing one or more hands on their head, waving a flag, and making a fist.

14. The method of claim 11, wherein the physical reaction comprises heart rate and the controlling step comprises controlling the at least one output device to display an audio and/or visual output representative of at least one of a range of detected heart rates, a number of remote viewers contributing a heart rate, and an average remote viewer heart rate.

15. The method of claim 11, wherein the physical reaction further comprises yelling and the method comprises controlling the at least one output device to display an audio and/or visual output representative of at least one of a range of detected yelling volumes in decibels, an average volume in decibels of detected yelling, and a combined total volume of detected yelling.

16. The method of claim 11, wherein the venue is a stadium.

17. The method of claim 16, wherein the at least one output device comprises one or more display screens on a wall of the stadium.

18. The method of claim 11, wherein the live event is broadcast on a radio, televised, and/or streamed over the internet and wherein the at least one output device further comprises a plurality of remote devices that are different from the plurality of user input devices.

19. The method of claim 11, wherein the at least one output device comprises one or more speakers that output a sound.

20. A remote engagement method for a live event occurring at a venue, comprising:

(i) receiving a plurality of signals each of said plurality of signals being representative of a physical reaction of each of a plurality of remote viewers that are remote from the venue, wherein said signals are generated from physical reactions of each of the plurality of remote viewers using detectors worn by each of the plurality of remote viewers, wherein said detectors are associated with at least one of a wristband, smartwatch, or shirt worn by each of the plurality of remote viewers, wherein said controller is configured to transmit said signals from the detectors to the at least one output device; and (ii) controlling at least one output device located remotely from the venue to display an audio and/or visual output representative of at least some of the plurality of signals received from the detectors, wherein the audio and/or visual output corresponds to one or more of a heart rate of one or more of the plurality of remote viewers, an indication that one or more of the plurality of remote viewers has raised one or more arms; and an indication that one or more of the plurality of remote viewers has executed a particular movement or signal with their hands that is not applause and is different from raising their arms.

21. The method of claim 20, wherein the physical reaction further comprises yelling.

22. The method of claim 20, wherein the indication includes one or more of placing one or more hands on their head, waving a flag, and making a fist.

23. The method of claim 20, wherein the physical reaction comprises heart rate and the controlling step comprises controlling the at least one output device to display an audio and/or visual output representative of at least one of a range of detected heart rates, a number of remote viewers contributing a heart rate, and an average remote viewer heart rate.

24. The method of claim 20, wherein the physical reaction further comprises yelling and the method comprises controlling the at least one output device to display an audio and/or visual output representative of at least one of a range of detected yelling volumes in decibels, an average volume in decibels of detected yelling, and a combined total volume of detected yelling.

25. The method of claim 20, wherein the venue is a stadium.

* * * * *